UNITED STATES PATENT OFFICE.

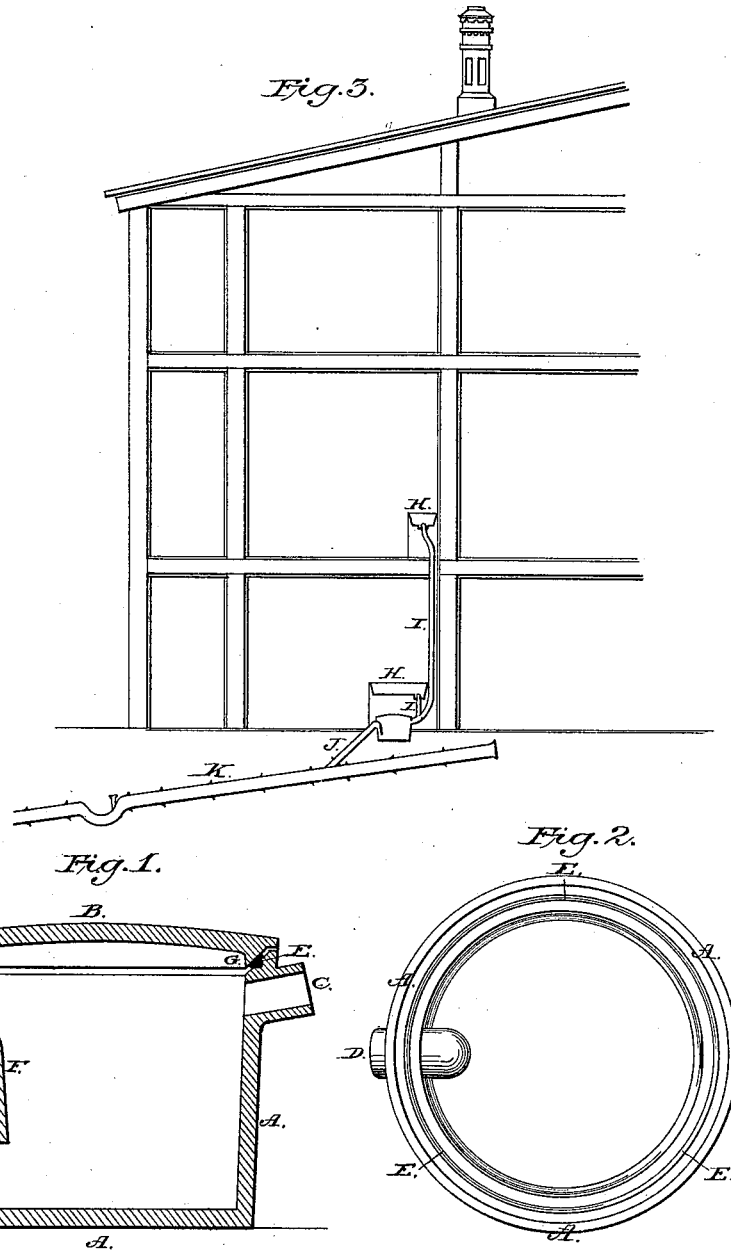

J. HERBERT SHEDD, OF PROVIDENCE, RHODE ISLAND.

IMPROVEMENT IN TRAPS FOR HOUSE-DRAINS AND WASTE-PIPES.

Specification forming part of Letters Patent No. 202,287, dated April 9, 1878; application filed January 5, 1878.

*To all whom it may concern:*

Be it known that I, J. HERBERT SHEDD, of Providence, in the county of Providence and State of Rhode Island, have invented a new and useful Improvement in Traps for House-Drains and Waste-Pipes, of which the following is a specification:

The invention relates to traps for catching grease and sediment entering waste-pipes coming from sinks or slop-basins.

Perhaps the most common and the most certain cause of obstruction to house-drains arises from grease, which, though fluid when it is hot, soon cools in the drains, and gradually, but certainly, closes them up. I have known drains from thirty to fifty feet in length closed nearly the whole distance from this cause. The amount which will collect from the waste of a single family is surprising to those who are not familiar with the subject. It ordinarily causes much more expense and inconvenience to allow this substance to run into the drain than to catch it in a grease-trap, from which it can be conveniently removed.

The object of my invention is to provide a means for catching and collecting this grease, so as to prevent it from entering the house-drains, and so that it can be removed at any time before it can enter such drains to become an obstruction.

The invention consists in having a pot or any hollow vessel made of vitrified stone-ware, or any other suitable material, as deep as may be required, having an inlet and an outlet hole to connect, respectively, with an inlet-pipe coming from the sink, and an outlet-pipe leading to the sewer, and a cover closing the pot at the top, resting upon and pressing down on a rope of clay, with a string through the middle, or any suitable packing material, and which is pressed into a groove in the top end of pot or seat for the cover, made to receive it.

In the accompanying drawing, in which similar letters of reference indicate like parts, Figure 1 is a vertical longitudinal section of my invention. Fig. 2 is a top view, looking down inside of pot; and Fig. 3 shows the application for use.

In Fig. 1, A A A represent the shell or wall of pot, which forms the body of trap or vessel to receive and hold the grease, sediment, &c. C represents the inlet-hole, to receive waste-pipe I, Fig. 3, coming from sinks H H, Fig. 3, and which discharge into pot A A A. D represents the outlet-hole, which connects with the outlet-pipe J, Fig. 3, leading to house-drains or sewer. This outlet-hole is made to extend downward inside the pot A A A to within three or four inches, or more, as may be desired, of the bottom of said pot by means of a wall or bend, F, the same shape as hole D, thus forming a pipe, or by means of a pipe of any other substance introduced through said hole, and bent downward in the same manner.

This arrangement of pot and inlet and outlet holes, as will readily be seen, forms the trap, and permits the grease to float on the top of the water in the pot, thus collecting in a mass, and preventing same from running over into the pipes leading to the house-drains.

B represents the cover to pot, with a wedge-shaped or conical rim, G G, which fits into and against the corresponding wedge or flaring shaped seat in top of pot A A A. E, Figs. 1 and 2, represents a groove made in this seat to receive the packing or rope of clay mentioned above in this specification. This construction allows cover to be wedged down tight against pot and packing to make a tight joint, to prevent any offensive odor or gases injurious to health escaping from pot, and also makes a joint easily broken and reset, when necessary to clean pot out.

In Fig. 3, H H represent sinks or slop-basins; I I, waste-pipes leading into pot or trap A A A. J is the outlet-pipe, leading to house-drain or sewer K.

The inlet-pipe C may be placed on a level with the lower end of the pipe F, to prevent all possible escape of gases to the sink.

What I claim is—

The combination of the pot or vessel A, having inlet-pipe C and outlet-pipe D, and bend F on said outlet-pipe, with the cover B, having conical rim G, the upper edge of the pot A being also conical and grooved for the packing, substantially as specified.

J. HERBERT SHEDD.

Witnesses:
CHARLES H. WHEELER,
CHARLES F. CHASE.